Patented Dec. 26, 1922.

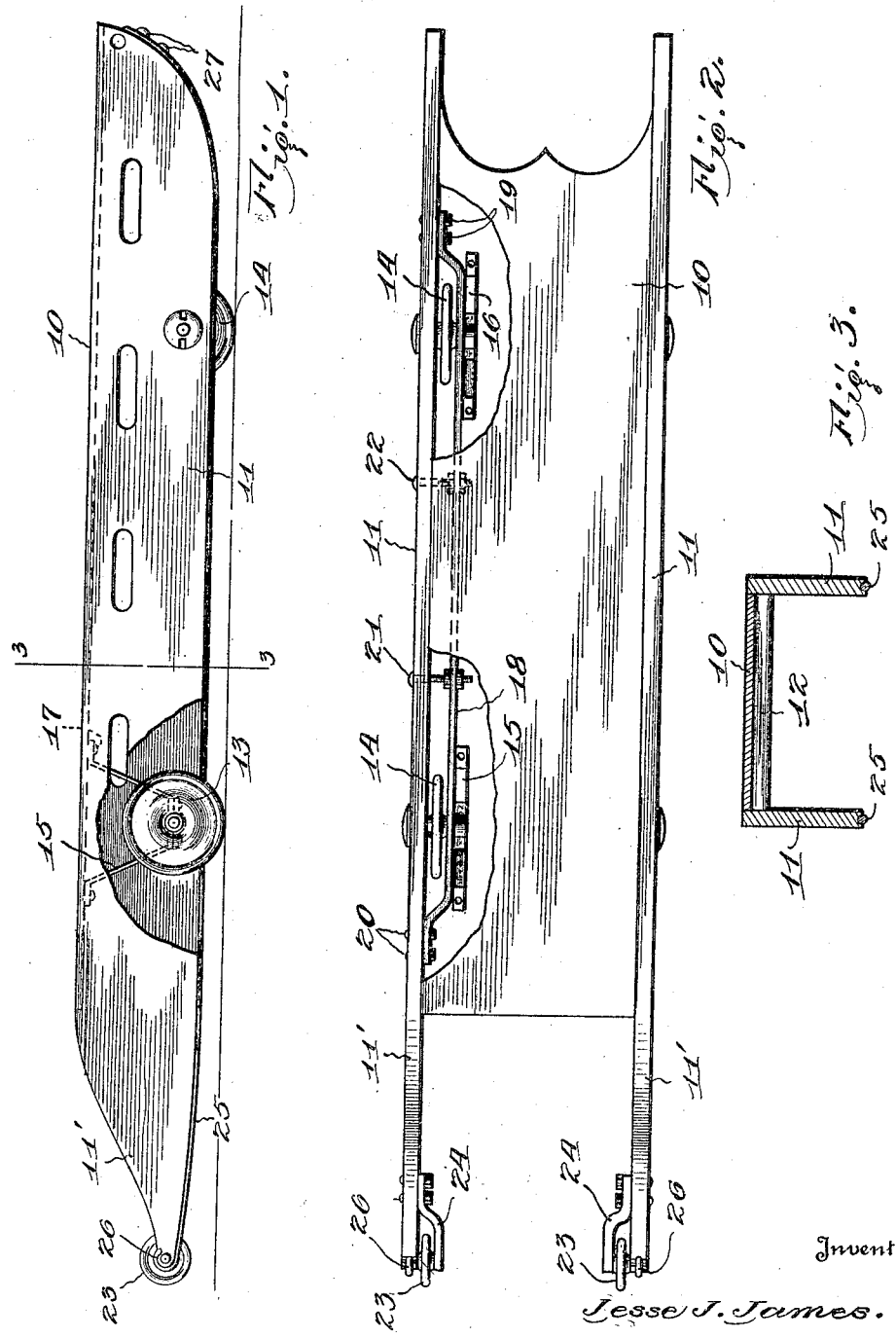

1,440,012

UNITED STATES PATENT OFFICE.

JESSE J. JAMES, OF WASHINGTON, DISTRICT OF COLUMBIA.

VEHICLE.

Application filed June 30, 1922. Serial No. 571,906.

*To all whom it may concern:*

Be it known that I, JESSE J. JAMES, residing at Washington, District of Columbna, a citizen of the United States, have invented certain new and useful Improvements in Vehicles, of which the following is a specification.

This invention relates to vehicles and is particularly adapted to that class of toys known as coasters.

One of the objects of my invention is to provide an improved vehicle having supporting wheels and additional wheels to the rear of the supporting wheels so constructed that they will ease the riding in going over undulating ground or pavement.

Another object of my invention is the provision of a vehicle which will be particularly useful as embodied in a coaster for children wherein a rear wheel is so placed with relation to the supporting wheels that when dropping onto the coaster from running, a rocking action takes place, which eases the fall and makes the coaster's use more pleasurable.

Another and still further object of my invention is the provision of a coaster for children having wheels so placed with relation to each other and the body of the coaster that when the front of the coaster is lifted, the rear will rest on a guide wheel or guide wheels which will enable the coaster to be swung from side to side during the lifting operation without backwardly overturning the coaster.

Referring to the drawing where I have illustrated a preferred embodiment of my invention, Figure 1 is an elevational view showing a part broken away.

Figure 2 is a plan view showing parts broken away.

Figure 3 is a cross sectional view on the line 3—3 of Figure 1.

Like reference characters refer to similar parts throughout the several views.

10 designates the platform or top of the vehicle or coaster, 11 the side supports thereof. The platform 10 and the side supports are fastened together in any suitable manner as by braces 12 shown in Figure 3.

Supporting wheels 13 and 14 are provided and are spaced to support the coaster, one pair near each end of the main body portion. These wheels are journaled on axles supported by the members 11 on the outside and by braces 15, 16 on the inside. These braces 15, 16 are secured to the platform 10 by screws or rivets 17 as illustrated in Figure 1. A longitudinal brace 18 is secured at its forward end by the bolts 19 and at its rearward end by the bolts 20. The axles of the wheels 14 pass through this brace 18. Spacing bolts 21, 22 serve to space the brace 18 from the side supports 11.

At the rear end of the side supports 11 are extensions 11' which carry wheels 23 which are here illustrated as being smaller than the supporting wheels 13, 14. The ground engaging points of the wheels 23 are normally spaced from the ground when the vehicle is resting upon its supporting wheels, as shown in Figure 1. The wheel 23 is supported by the side support extension 11' and by the bracket 24 shown in Figure 2.

Runners 25 are secured in a groove at the bottom of the side support 11 by a loop 26 at the rear end and the screws 27 at the forward end. These runners may be detached during the summer and the wheels detached during the winter if it is desired to use the coaster as a snow sled.

It is readily seen that in dropping onto this coaster when coasting on ground or on pavement, the small wheels 23' striking first, the rear supporting wheels 13 striking next and the forward supporting wheels 14 striking last, will give a rocking action which will break the suddenness of the fall and make the coaster's use more pleasurable. In addition to this feature, when steering it is customary to lift the front wheels with a jerk and swing to one side at the same time. Without the rear additional wheels, it would be easier to swing too far either to the side or over toward the rear. These small wheels act as steadying members to prevent this. In encountering holes in the pavement or ground the small rear wheels also come into play and make riding easier.

While I have described an embodiment of my invention in detail, I desire to have it understood that I do not limit myself to the exact showing and that modifications and changes may be made without departing from the spirit of my invention and within the scope of the appended claim.

Having described my invention, what I claim is:—

A coaster vehicle comprising a low platform, side supporting members for the platform, two pairs of supporting wheels rotatably mounted adjacent the platform and inward of the side supporting members, one pair of which is forward of the other, a pair of smaller additional wheels at the rear of the rear supporting wheels and having their ground engaging points above the ground engaging points of the supporting wheels, the axis of each of the additional wheels remaining in substantially the same vertical plane.

In testimony whereof I hereunto affix my signature.

JESSE J. JAMES.